US008862944B2

(12) United States Patent
Dodson et al.

(10) Patent No.: US 8,862,944 B2
(45) Date of Patent: Oct. 14, 2014

(54) ISOLATION OF FAULTY LINKS IN A TRANSMISSION MEDIUM

(75) Inventors: John S. Dodson, Pflugerville, TX (US); Frank D. Ferraiolo, New Windsor, NY (US); Michele M. Franceschini, White Plains, NY (US); Kevin C. Gower, LaGrangeville, NY (US); Lisa C. Gower, legal representative, LaGrangeville, NY (US); Ashish Jagmohan, Irvington, NY (US); Luis A. Lastras-Montano, Cortlandt Manor, NY (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/822,508

(22) Filed: Jun. 24, 2010
(Under 37 CFR 1.47)

(65) Prior Publication Data
US 2011/0320881 A1 Dec. 29, 2011

(51) Int. Cl.
*G06F 11/00* (2006.01)
*G06F 11/20* (2006.01)
*G06F 11/10* (2006.01)
*H04L 1/00* (2006.01)

(52) U.S. Cl.
CPC ............ *G06F 11/10* (2013.01); *G06F 11/2005* (2013.01); *H04L 2001/0096* (2013.01); *H04L 1/0061* (2013.01)
USPC ................... 714/43; 714/25; 714/48; 714/56; 714/704; 714/799

(58) Field of Classification Search
USPC ........................... 714/43, 25, 48, 56, 704, 799
See application file for complete search history.

(56) References Cited

U.S. PATENT DOCUMENTS

| 4,360,917 | A | | 11/1982 | Sindelar et al. |
|---|---|---|---|---|
| 4,744,083 | A | * | 5/1988 | O'Neill et al. ................ 714/704 |
| 4,964,129 | A | | 10/1990 | Bowden, III et al. |
| 5,010,544 | A | * | 4/1991 | Chang et al. .................. 370/243 |
| 6,024,486 | A | | 2/2000 | Olarig et al. |
| 6,557,121 | B1 | | 4/2003 | McLaughlin et al. |
| 6,973,602 | B1 | * | 12/2005 | Fung et al. .................... 714/704 |
| 7,020,076 | B1 | * | 3/2006 | Alkalai et al. ................ 370/217 |
| 7,451,362 | B2 | * | 11/2008 | Chen et al. .................... 714/704 |
| 7,836,352 | B2 | * | 11/2010 | Sharma et al. .................. 714/44 |
| 7,904,771 | B2 | * | 3/2011 | Mochizuki .................... 714/724 |

(Continued)

OTHER PUBLICATIONS

U.S. Appl. No. 12/822,498, filed Jun. 24, 2010.

(Continued)

*Primary Examiner* — Loan L. T. Truong
(74) *Attorney, Agent, or Firm* — Cantor Colburn LLP

(57) ABSTRACT

Isolation of faulty links in a transmission medium including a method that includes receiving an atomic data unit via a multi-link transmission medium that has a plurality of transmission links. An error condition is detected and it is determined that the error condition is isolated to a single transmission link. It is determined if the single transmission link has been isolated previously as a failing transmission link a specified number of times within an interval specified by a timer. If the single transmission link has been isolated previously as a failing transmission link a specified number of times within an interval specified by a timer then: identifying the single transmission link as a faulty transmission link; resetting the timer; and outputting an identifier of the single transmission link.

21 Claims, 5 Drawing Sheets

(56) References Cited

U.S. PATENT DOCUMENTS

| | | | |
|---|---|---|---|
| 8,484,529 B2 * | 7/2013 | Alves et al. | 714/758 |
| 8,566,682 B2 * | 10/2013 | Gower et al. | 714/785 |
| 8,631,271 B2 * | 1/2014 | Gower et al. | 714/6.1 |
| 2003/0048859 A1 * | 3/2003 | Wedding | 375/317 |
| 2004/0179527 A1 | 9/2004 | Cypher | |
| 2005/0088966 A9 * | 4/2005 | Stewart | 370/218 |
| 2005/0132258 A1 | 6/2005 | Chen et al. | |
| 2006/0048018 A1 * | 3/2006 | Hosoya et al. | 714/48 |
| 2006/0181942 A1 | 8/2006 | Cordero et al. | |
| 2006/0212775 A1 * | 9/2006 | Cypher | 714/758 |
| 2007/0011549 A1 * | 1/2007 | Sharma | 714/746 |
| 2007/0116161 A1 * | 5/2007 | Tokoro et al. | 375/347 |
| 2007/0157054 A1 * | 7/2007 | Frodsham et al. | 714/704 |
| 2008/0002590 A1 | 1/2008 | Thomas et al. | |
| 2008/0005620 A1 * | 1/2008 | Walker | 714/43 |
| 2008/0005706 A1 * | 1/2008 | Sharma et al. | 716/4 |
| 2008/0209306 A1 * | 8/2008 | Frodsham et al. | 714/801 |
| 2010/0005345 A1 | 1/2010 | Ferraiolo et al. | |
| 2010/0005349 A1 * | 1/2010 | Ferraiolo et al. | 714/704 |
| 2010/0005375 A1 | 1/2010 | Dell et al. | |

OTHER PUBLICATIONS

International Search Report and Written Opinion of the ISA dated Sep. 7, 2011—International Application No. PCT/EP2011/059534.
International Search Report and Written Opinion of the ISA dated Oct. 5, 2011—International Application No. PCT/EP2011/059533.

* cited by examiner

ISOLATION OF FAULTY LINKS IN A TRANSMISSION MEDIUM

BACKGROUND

This invention relates generally to computer systems, and more particularly to detection of a faulty lanes in a transmission medium.

One approach to locating a failing lane (i.e. a lane with data errors) in a transmission medium, such as a bus, is to use an error correcting code (ECC). An ECC can detect and correct a number of failing bits, but requires more redundant bits than an error detection code (e.g., a cyclical redundancy code or "CRC"). In addition, an ECC can be used to detect specific bits that are failing (the number of bits detectable depending on the particular ECC code being implemented); however a drawback of ECC is that it does not determine when it is time declare a failing lane as faulty and to replace it. Typically, an error detection code can detect an error but is not capable of fully resolving the physical nature of the error; for example, it may not be able to fully identify a failing lane for all possible error patterns in the failing lane. Therefore, a drawback of using an error detection code is that may not accurately isolate errors to specific failing lanes. Another approach to detecting a failing lane is lane shadowing, where a copy of data is sent on spare lanes. However, a drawback to lane shadowing is that it only operates on a subset of lanes at any point in time and can miss error events occurring outside of the analysis window for a given failing lane.

Accordingly, and while existing techniques for dealing with error detection and correction may be suitable for their intended purpose, there remains a need in the art for e schemes that overcome these drawbacks in relation to detecting faulty lanes.

SUMMARY

An embodiment is a computer implemented method for identifying transmission errors. The method includes receiving an atomic data unit via a multi-link transmission medium that has a plurality of transmission links. An error condition is detected and it is determined that the error condition is isolated to a single transmission link. It is determined if the single transmission link has been isolated previously as a failing transmission link a specified number of times within an interval specified by a timer. If the single transmission link has been isolated previously as a failing transmission link a specified number of times within an interval specified by a timer then: identifying the single transmission link as a faulty transmission link; resetting the timer; and outputting an identifier of the single transmission link.

Another embodiment is a system for identifying transmission errors. The system includes a receiver for receiving an atomic data unit via a multi-link transmission medium, the multi-link transmission medium including a plurality of transmission links. The system also includes an error isolation unit in communication with the receiver, the error isolation unit configured to perform a method. The method including detecting an error condition that is isolated to a single transmission link. It is determined if the single transmission link has been isolated previously as a failing transmission link a specified number of times within an interval specified by a timer. If the single transmission link has been isolated previously as a failing transmission link a specified number of times within an interval specified by a timer then: identifying the single transmission link as a faulty transmission link; resetting the timer; and outputting an identifier of the single transmission link.

An additional embodiment is a computer program product for identifying transmission error. The computer program product includes a tangible storage medium readable by a processing circuit and storing instructions for execution by the processing circuit for performing a method. The method includes receiving an atomic data unit via a multi-link transmission medium that has a plurality of transmission links. An error condition is detected and it is determined that the error condition is isolated to a single transmission link. It is determined if the single transmission link has been isolated previously as a failing transmission link a specified number of consecutive times. If the single transmission link has been isolated previously as a failing transmission link a specified number of consecutive times: identifying the single transmission link as a faulty transmission link; and outputting an identifier of the single transmission link.

A further embodiment is a system for identifying transmission errors. The system includes a syndrome analysis means for receiving syndromes associated with an atomic data unit; for detecting an error condition, for analyzing the error condition to determine if the error condition can be isolated to a single transmission link that has been previously isolated within a specified number of preceding error events; and for outputting a signal indicating one of a single transmission link that has previously been isolated within a specified number of preceding error events, a single transmission link that has not been previously isolated within a specified number of preceding error events and an error that cannot be isolated to one transmission link. The system also includes a same lane error counter in communication with the syndrome analysis means for receiving the signal and for incrementing in response to the signal indicating a single transmission link that has been previously isolated within a specified number of preceding error events; and for resetting in response to the signal indicating a single transmission link that has not been previously isolated within a specified number of preceding error events. The system also includes a same lane error threshold comparator in communication with the same lane error counter for outputting an identifier of the single transmission link in response to determining that the same lane error counter has exceeded a same lane error threshold. The system further includes a general error counter in communication with the syndrome analysis means for receiving the signal and for incrementing in response to the signal indicating an error that cannot be isolated to one transmission link, or can be isolated to a single transmission link that has not been isolated previously as a failing transmission link within a specified number of preceding error events. The system further includes a general lane error threshold comparator in communication with the general error counter for outputting a general error flag in response to determining that the general error counter has exceeded a general error flag threshold.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
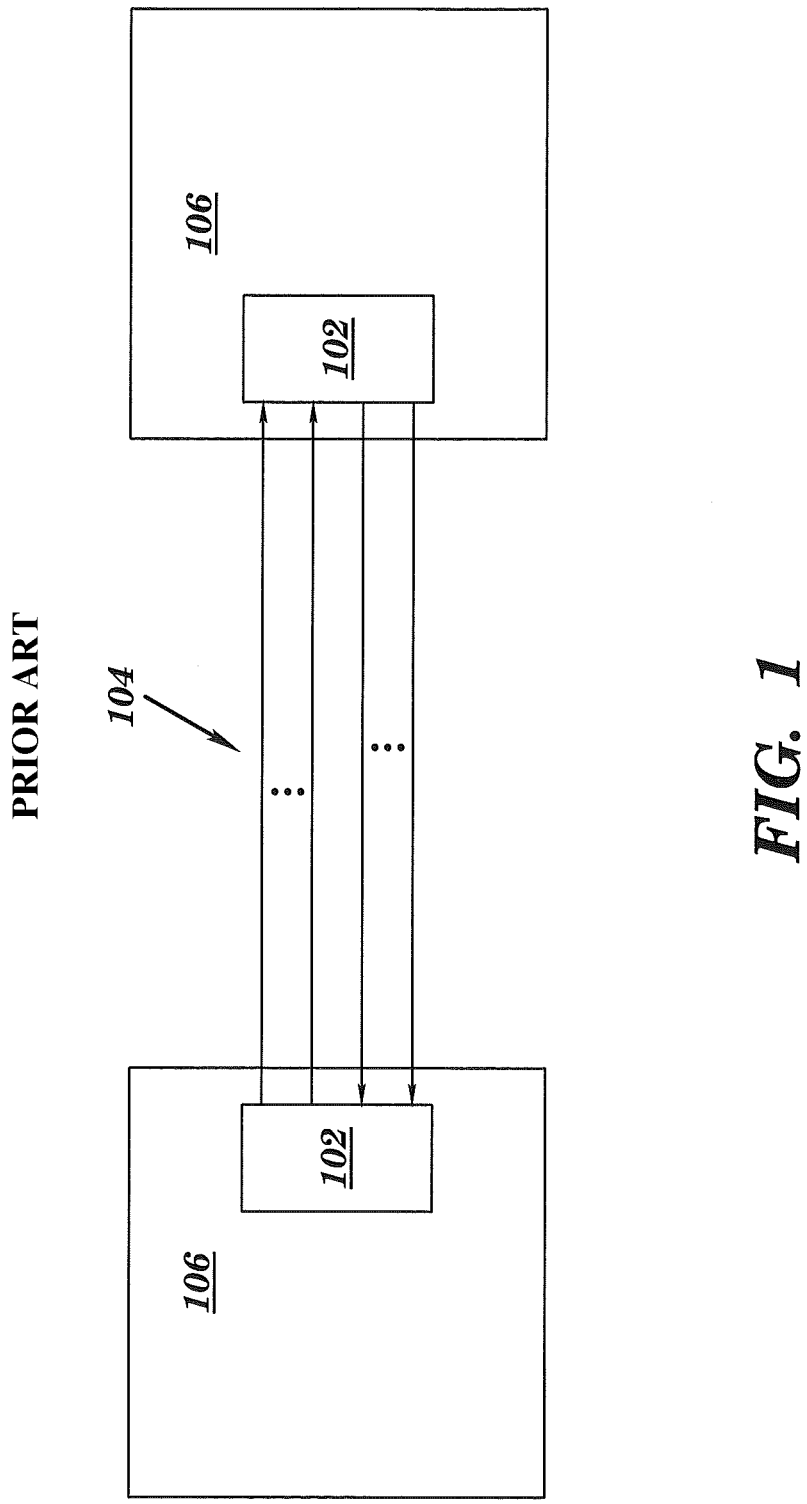
FIG. 1 depicts a system including a transmission medium facilitating data communication between two circuits according to an embodiment.

An embodiment addresses issues associated with detecting a faulty lane in a multi-link transmission medium (e.g., a communication bus, a memory bus) by providing real-time monitoring of error events in data transmissions over the multi-link transmission medium. As used herein, the term "faulty lane" refers to a lane on which the bit-error-rate (BER) is significantly higher than the BER expected in a correctly functioning multi-link transmission medium. For example, a correctly functioning bus may be expected to have a BER of no greater than $10^{-10}$ and a lane with a BER greater than $10^{-7}$ may be defined as a faulty lane. Once such a lane is identified action can be taken (e.g., the lane can be taken out of service). As used herein, the terms "failing lane", "bad lane" and "erroneous lane" refer to a lane on which there are data errors during a data transmission. As used herein the terms "lane" and "link" are used interchangeably to refer to a single communication path in a multi-link (or multi-lane) transmission medium.

A system (e.g., a memory system, a communication system) may utilize cyclical redundancy codes (CRC) to protecting each data transmission. The CRC suffices to detect when transmission errors occur, but may not be sufficient to identify that a particular lane error occurred and/or the identity of the erroneous lane. This is a common scenario since lane identification requires a greater amount of parity/check bits than a simple identification of transmission errors on the bus. In some designs fewer parity/check bits are used in combination with retries in order to allow higher instantaneous communication efficiency. However, a faulty lane can cause repeated errors and as a result, decrease the overall throughput of the system by causing too many retries. In fact, a lane with a sufficiently high BER may impede communication to the point where system performance completely stalls. Thus, it is desirable to be able to quickly identify a lane with a high BER in order to potentially correct the problem to minimize the impact on the system or operation.

One way of detecting a failing lane is described in commonly assigned U.S. patent application Ser. No. 12/822,498, entitled "Failing Bus Lane Detection Using Syndrome Analysis" filed on Jun. 24, 2010, which is incorporated by reference herein in its entirety. In an embodiment where the data-protection code cannot be used to uniquely identify erroneous lane locations, a faulty lane is detected by monitoring transmission errors. For each detected error (or error condition), syndrome analysis is used to form a list of the lanes that could be causing the error condition. The syndrome "votes" for the lanes. A counter per lane is maintained, and counters are incremented with the votes. As the error in the faulty lane changes, the voted lanes change. After a pre-specified number of votes have been collected, the faulty lane is identified by analyzing the counter values. In another embodiment an ECC code is used to protect the transmission and ECC syndrome analysis is used to form the list of lanes. In another embodiment a hardware circuit which monitors physical attributes such as power or impedance is used to form the list of lanes.

An embodiment described herein is directed to interfaces where the probability of an incorrect lane vote is relatively low and where faults other than single lane faults are possible. Because the probability of an incorrect lane vote is relatively low, an embodiment as described herein can utilize a voting mechanism with a low overhead (e.g., a small amount of hardware and/or software). In addition, an embodiment described herein can differentiate between a single-lane fault and other fault events (e.g., clock faults, multiple-lane faults etc.), in addition to faulty single lane identification.

Embodiments described herein include systems and methods for detecting a faulty lane in a communication bus, when the error correction code (ECC) or CRC protecting each data transmission, or atomic data unit, suffices to detect that a transmission error has occurred but is not sufficient to identify that a lane error occurred and/or the identity of the erroneous lane. The embodiments can also be used to identify faulty lanes in the case where an ECC is used to identify the error pattern for each of a sequence of data transmissions.

As used herein the term "atomic data unit" refers to information sent on multiple links that is treated as a unit. Generally, an atomic data unit includes one or more groups of bits being transferred concurrently (or otherwise related in time) to each other across multiple transmission links. An atomic data unit may include, but is not limited to: a packet of data, and a frame of data.

A basic circuit for implementing an embodiment includes two counters (e.g., a same lane error counter and a general error counter), two corresponding timers, and a lane identification register. On an error event, syndrome analysis is performed to identify the possible erroneous lanes that alone can explain the error condition. These possible erroneous lanes are referred to herein as "candidate lanes". Each "candidate lane" can explain the error condition by itself; in other words, there exists an error pattern restricted to that lane which can explain the observed syndrome. The same lane error counter is incremented if there is only one candidate lane and the index of that lane matches the current contents of the lane identification register. If there is a single candidate lane we say that the error condition has been isolated to a single failing lane. If there is a single candidate lane and its identity is not the same as the current contents of the lane identification register, the same lane error counter is reset to the value zero, and the lane identification register is updated with the value of the current candidate lane. In an embodiment, if there are multiple candidate lanes, the same lane error counter is reset to zero, and the lane identification register is invalidated.

In an embodiment, the same lane error counter is also reset to zero when a specified time period elapses (referred to herein as an "interval specified by a timer") as measured by a timer (e.g., a same lane error timer). In another embodiment reset involves decreasing the counter value by a pre-specified amount rather than setting the value to zero. In another embodiment reset involves decreasing the counter value by an amount which is a function of the current counter value rather than setting the value to zero. An example of such a function is the counter value divided by two; other functions are also possible. If the same lane error counter value exceeds the pre-specified threshold, and in the pre-defined time (set by the timer) the lane identified by the lane identification register is identified as bad, and a pre-specified response action is taken by the system.

In an embodiment, as the timer expires it resets the same lane error counter. The timer would then be reset, and optionally stopped. In addition, the timer is reset, and optionally stopped, when the same lane error counter or same lane error timer threshold is exceeded. In one embodiment, the timer is reset and optionally stopped when an error event is observed which cannot be explained by a single candidate lane. In one embodiment, the timer is reset and started (restarted if needed) when an error event is observed which can be explained by a single candidate lane, and the candidate lane does not match the contents of the lane identification register the next error event is observed. In another embodiment, the timer is reset and started (restarted if needed) when an error event is observed which can be explained by a single candidate lane. In this embodiment the same lane error counter is not reset every time the timer resets; the counter is only reset when a single failing lane cannot be identified, or a single failing lane is identified which does not match the contents of the lane identification register, or when the counter or timer threshold is exceeded.

In accordance with an embodiment, the general error counter is used to identify fault events other than a single faulty lane, and every error event that does not increment the same lane error counter instead increments the general error counter. The general error counter is periodically decremented (e.g., by half it's current value) when a specified time period elapses using a second timer (e.g., a general error timer). The general error timer is then reset and restarted. If the value of the general error counter exceeds a pre-specified threshold, a fault event other than a single lane fault is declared, and a pre-specified response action is taken by the system. In another embodiment, the general error counter is reset to zero or another pre-specified value and restarted when certain events occur; for example, if a lane is identified as faulty.

Counters, thresholds and timers are described herein as being utilized by embodiments to track and report possible errors. It will be appreciated that other manners of keeping track of the number and rate of consecutive errors pointing to a single lane, or the number and rate of errors in general may be implemented by other embodiments. For example, a decrementer may be implemented and/or a shifter.

FIG. 1 depicts a system including a multi-link transmission medium facilitating data communication between two circuits according to an embodiment. FIG. 1 includes a multi-link transmission medium 104 (e.g., a communication bus, a memory bus) facilitating data communication between two error isolation units 102 which store or process data and are located within an electronic circuit element 106. In an embodiment, the data is transferred in atomic data units and unit error isolation unit 102 analyzes the atomic data units. In an embodiment, the error isolation units 102 are used in a memory system and located on a processor, a memory device, a memory controller, a memory module, and/or other memory system components. In an embodiment, the multi-link transmission medium 104 is implemented by any medium for transferring data such as, but not limited to: physical wires, fiber optics, and wireless mediums.

In one embodiment, the system depicted in FIG. 1 is a communication system, the multi-link transmission medium 104 is a wireless network and the error isolation units 102 are transceivers for receiving and transmitting data across the wireless network. In another embodiment, the system depicted in FIG. 1 is a memory system, the multi-link transmission medium 104 is a memory bus, one of the error isolation units 102 is a buffer device, the other error isolation unit 102 is a memory controller, one circuit 106 where the buffer device is located is a memory module and the other circuit 106 where the memory controller is located is a processor. In another embodiment, the system depicted in FIG. 1 is a memory system, the multi-link transmission medium 104 is a memory bus, both of the error isolation units 102 are buffer devices, and both of the circuits 106 are memory modules. In another embodiment, the system depicted in FIG. 1 the multi-link transmission medium 104 is a wireless network, both of the error isolation units 102 are transceivers, and both of the circuits 106 are processors. Embodiments of the system depicted in FIG. 1 may be implemented on a variety of hardware elements, but not limited to, communication system elements and memory system elements. As such, the previous examples are illustrative in nature and not intended to limit embodiments to particular hardware implementations.

Figure 2:
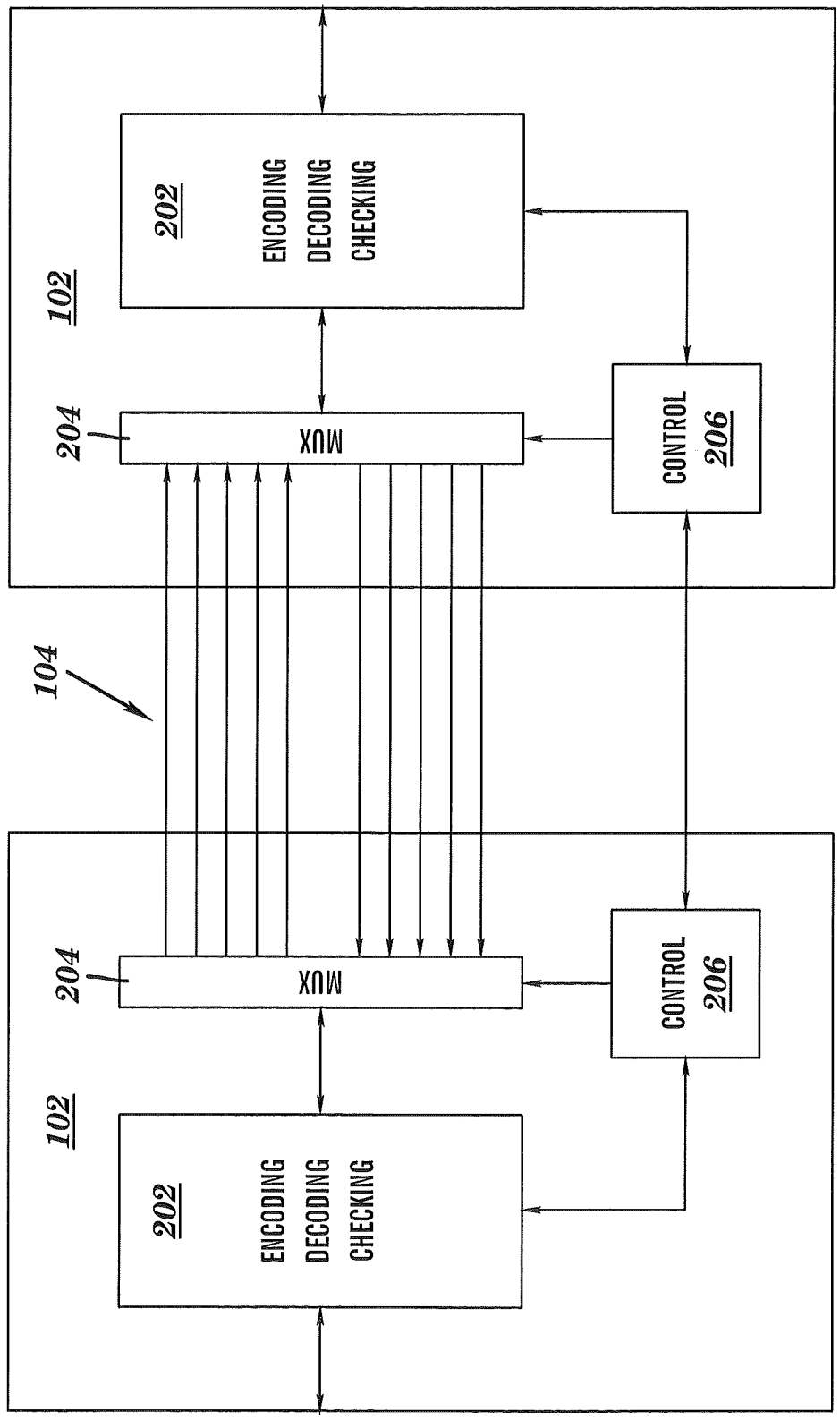
FIG. 2 depicts a system including a transmission medium that is protected using an error correction and/or error detection code according to an embodiment.

FIG. 2 depicts a system including a multi-link transmission medium that is protected using an error correction and/or error detection code according to an embodiment. In the embodiment depicted in FIG. 2, communication through the multi-link transmission medium (e.g., a bus) is protected through an ECC or CRC code. The multi-link transmission medium 104 includes several communication links (i.e., lanes), including some redundant links. In an embodiment, the encoding/decoding modules 202 perform: ECC/CRC encoding on an atomic data unit to transmission across the multi-link transmission medium 104; decoding and checking of the received atomic data unit of data; and communication of decoding results to control modules 206. In an embodiment, the multiplexers 204 include receivers and transmitters and control the access to the physical links on the multi-link transmission medium 104 including rerouting signals through the redundant lanes (e.g., the spare lanes). The control modules 206 (implemented by hardware, software and/or firmware) are described further herein below and are utilized to take action (e.g., set a flag, use a spare link, etc.) based on error patterns detected by the encoding/decoding modules 202.

Figure 3:
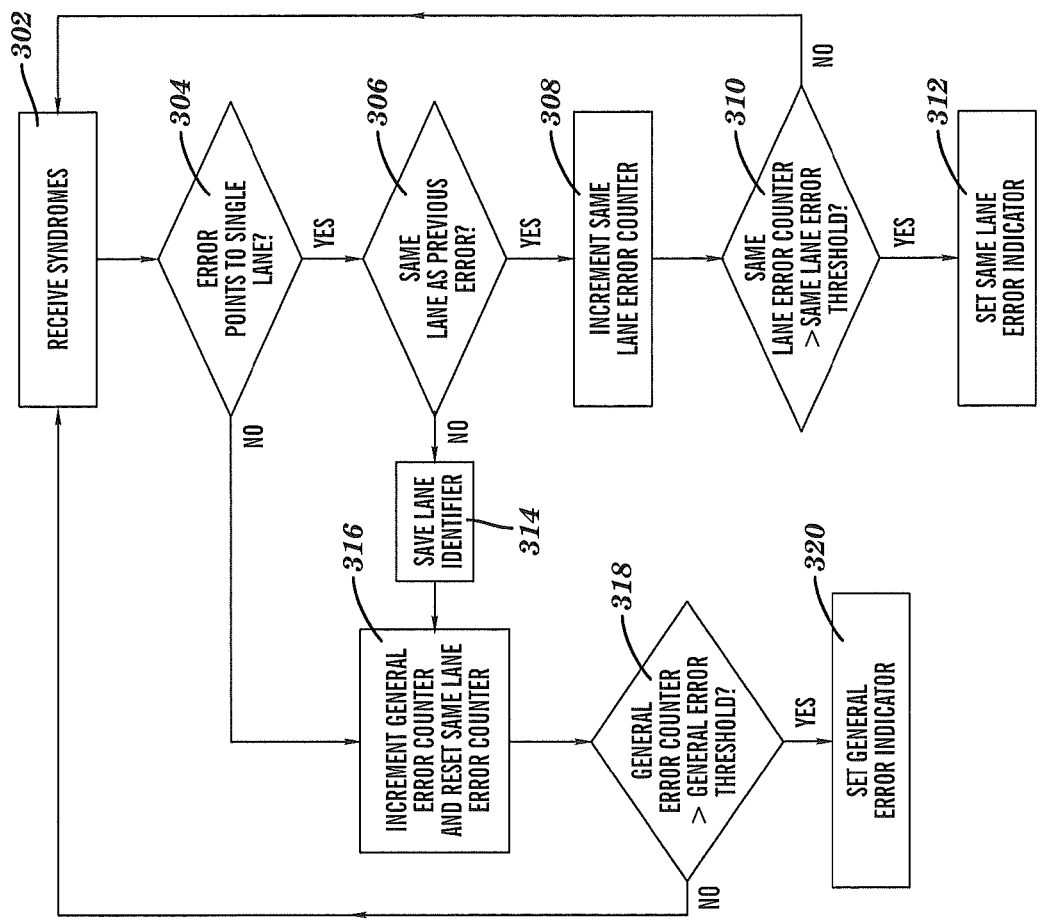
FIG. 3 depicts a process flow that is implemented by an embodiment.

FIG. 3 depicts a process flow that is implemented by an embodiment of the control module 206. At block 302, the control module 206 receives syndromes from the encoding/decoding module 202 when a failure (also referred to herein as an "error condition") is detected on an atomic data unit (e.g., packet, frame, or other unit of data being transferred) of data sent across the multi-link transmission medium 104. The control module 206 analyzes the syndromes, at block 304, to determine if the syndromes indicate that a single lane in the multi-link transmission medium 104 is causing the failure. If the syndromes indicate that a single lane is causing the failure, then block 306 is performed to determine if the isolated lane (also referred to herein as an "identified lane") is the same lane as the previous single lane error. If it is the same lane, then block 308 is performed and the same lane error counter is incremented to indicate that another consecutive error has been found in the failing lane.

At block 310, the control module 206 determines if a programmable same lane error threshold has been exceeded. If the same lane error threshold has been exceeded, then bock 312 is performed and a same lane error indicator is set, and some prescribed action is taken. In an embodiment, the same lane error indicator is sent to a controller or processor. In an embodiment, the control module 206 sets the multiplexer to spare out the failing lane and to use a redundant lane in its place. In an embodiment, if all of the redundant lanes are already being used, the control module 206 may cause operation of the system to halt or some other action such as changing the width of the bus in order to eliminate the identified faulty lane (or identified failing transmission link) If, at block 310, it is determined that the same lane error counter has not exceeded the same lane error threshold, then processing continues at block 302 with more syndromes being received.

If it is determined at block 306, that the lane indicated by the syndromes as causing the error is not the same as the previous lane causing the error, then the current lane identifier is saved (e.g., into a lane identifier register) at block 314. Next, block 316 is performed. At block 316, the general error counter is incremented and the same lane error counter is reset. Processing then continues at block 318.

If it is determined at block 304, that the syndromes do not point to a single lane as causing the error, then block 316 is performed. At block 316, the general error counter is incremented and the same lane error counter is reset. Processing then continues at block 318 where it is determined if the general error counter has exceeded a programmable general error threshold. If the programmable general error threshold has been exceeded, then block 320 is performed to set a general error indicator. In an embodiment, the control module 206 alerts a controller or processor about the error. In another embodiment, the control module 206 causes operation of the system to halt. If, at block 318, it is determined that the general error counter has not exceeded the general error threshold, then processing continues at block 302 with more syndromes being received.

Though not shown in FIG. 3, an embodiment includes resetting the same lane error counter when a timer (e.g., a same lane error counter timer) expires. At that point the same lane error counter timer could be reset, or stopped. In an embodiment, the same lane error counter timer is reset, and optionally stopped, when a threshold (e.g., a same lane error threshold) is exceeded. Also, the general error counter is reduced in value by decrementing or by shifting down, when the general error timer expires. The general error timer is then reset and restarted.

Figure 4:
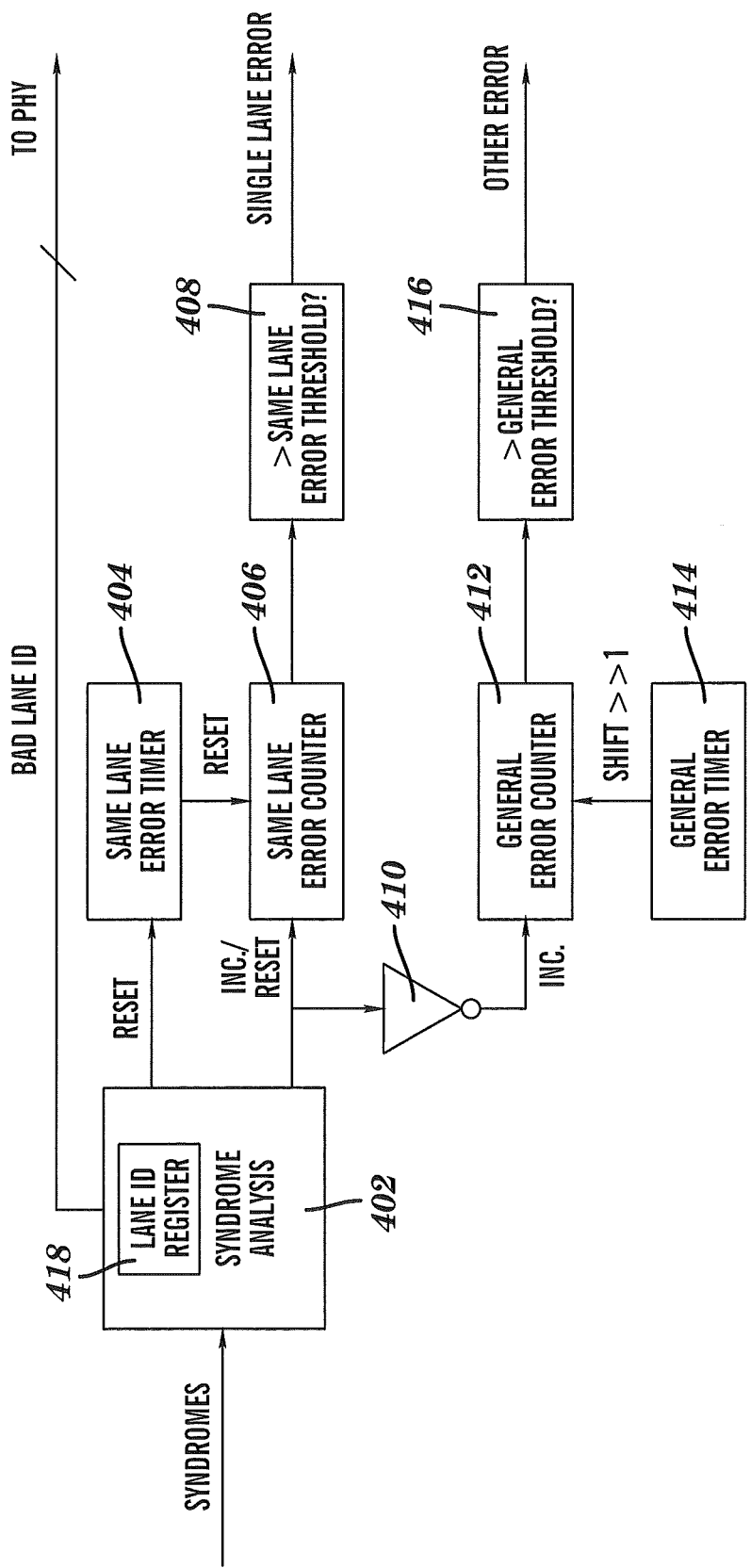
FIG. 4 depicts a system for implementing a control module in accordance with an embodiment.

FIG. 4 depicts a system for implementing the control module 206 in accordance with an embodiment. As shown in FIG. 4, the syndromes are input to the syndrome analysis means 402 (implemented by hardware, software and/or firmware), which performs any voting analysis known in the art. The output of the syndrome analysis means 402 is one (or more, in specific embodiments) bad lane identifiers and well as reset/increment signals. In an embodiment, a lane identifier register 418, which holds the identifier of the last bad lane identifier is part of the syndrome analysis means 402. The same lane error counter 406 is incremented if there is only one bad lane and the index of that lane matches the current contents of the lane identifier register 418 (i.e., the same lane error counter 406 counts the number of times the same lane has been consecutively identified previously as failing). If there is a single bad lane, but its identity is different from the contents of the lane identification register, or the lane identification is not a valid value, then the same lane error counter 406 is reset to the value zero, and the lane identifier register 418 is updated with the identity of the current single bad lane. In an embodiment, if there is a single bad lane having an identity that is different than the contents of the same lane identifier register 418, then the value of the identity of the current single bad lane is stored into the same lane identifier register 418. In addition, the general error counter 412 is incremented.

If there are multiple candidate lanes, then the same lane error counter 406 is reset to zero and the lane identifier register 418 is invalidated (e.g., set to a value that does not indicate any of the lanes). The same lane error counter 406 is also periodically reset using a same lane error timer 404 with a pre-specified time threshold (i.e., the same lane error counter 406 is reset when a pre-specified time period has elapsed), or when the syndrome analysis means 402 issues a reset signal to the same lane error timer 404. This may happen when an error event is observed which cannot be explained by a single candidate lane or when an error event is observed which can be explained by a single candidate lane, and the candidate lane does not match the contents of the lane identification register the next error event is observed. In addition, the timer 404 is reset, and optionally stopped, when the same lane error counter or same lane error timer threshold is exceeded. If the same lane error counter 406 value exceeds a pre-specified same lane error threshold as determined by the same lane error threshold comparator 408, the lane identified by the lane identifier register 418 is identified as a faulty lane. Optionally, upon a change of content of the lane identifier register 418, when the new content represents a valid value, the same lane error counter 406 is set to one.

Note that the higher the BER, the more quickly the same lane error counter 406 will increment and a bad lane is identified. Lower BERs will take longer to recognize but have less impact on system operation.

The ability to program the value of the same lane error threshold via the same lane error threshold comparator 408 on the same lane error counter 406, and the ability to program the same lane error timer 404, provides parameters to tailor the system to specific engineering needs, such as the allowable BER differential between good and bad lanes, and the allowable absolute BER values.

The general error counter 412 is used to identify fault events other than a single faulty lane. Every error event that does not increment the same lane error counter 406 instead increments the general error counter 412. In an embodiment, the general error counter 412 is periodically shifted down by a bit using a general error timer 414 (i.e., the general error counter 412 is reset or reduced when a pre-specified time period has elapsed). If the value of the general error counter 412 exceeds a pre-specified general error threshold as determined by the general error threshold comparator 416, a fault event other than a single lane fault is declared, and a pre-specified response action is taken by the system.

In an embodiment one or all of the same lane error timer 404, same lane error counter 406, same lane error threshold comparator 408, general error counter 412, general error timer 414, and general error threshold comparator 416 are programmable at system start up or during run-time. In an embodiment, at least one is programmed during run-time in response to current operating conditions.

Figure 5:
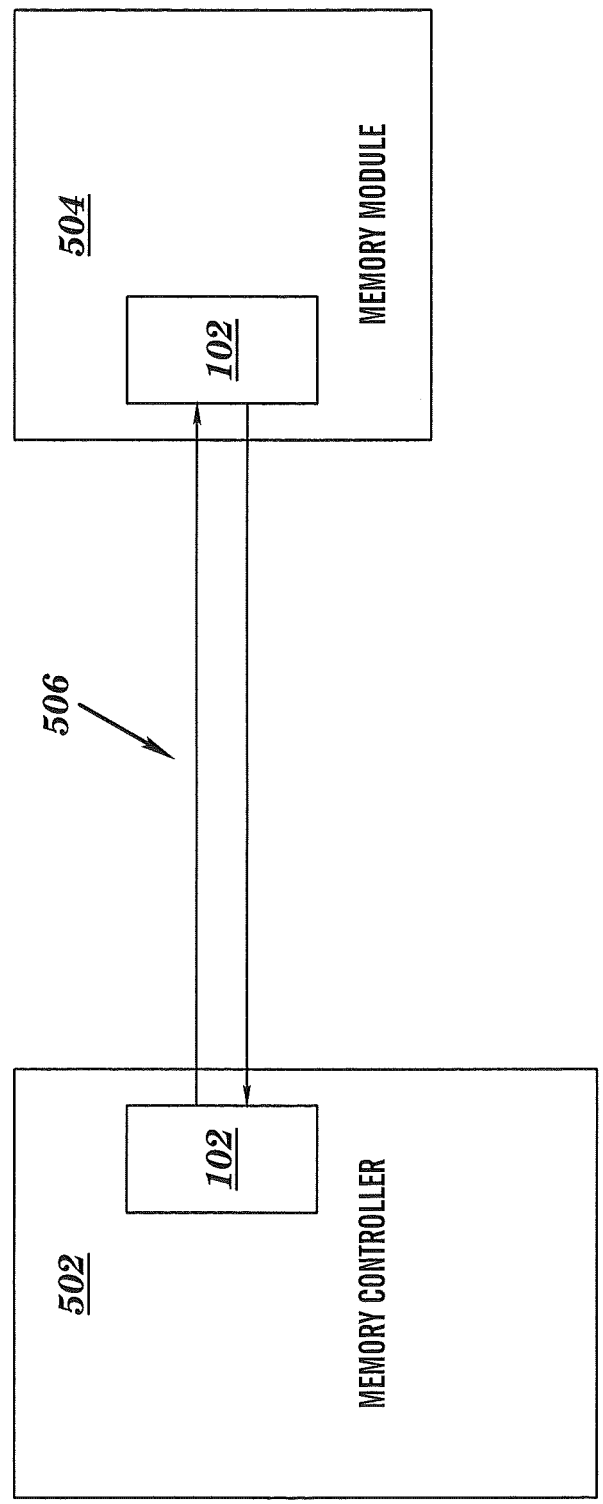
FIG. 5 depicts a memory system that is implemented in accordance with an embodiment.

FIG. 5 depicts a memory system that is implemented in accordance with an embodiment. As shown in FIG. 5, the multi-link transmission medium is implemented by a memory bus 506 that includes an upstream bus and downstream bus, each bus comprising a plurality of links (or lanes). In addition, the circuits 106 are implemented by a memory controller 502 and a memory module 504. In an embodiment, the memory module 504 includes a plurality of memory devices for storing data. Also shown in FIG. 5 are the error isolation units 102 for performing the processing described herein to isolate and identify a failing memory lane and to identify the presence of errors not isolated to a particular memory lane.

Technical effects and benefits of embodiments include a very low hardware complexity and a relatively short detection time that allows online fault isolation and repair. In addition, an embodiment can distinguish between single-lane faults and other fault conditions, and thus it is suitable for use in a system wherein faults other than single lane faults are possible. In addition, an embodiment can be utilized to halt operation of a machine if severe reliability issues occur. A further benefit is the adaptivity provided by being able to program the timers and thresholds.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, it will be understood that the use of the terms first, second, etc. do not denote any order or importance, but rather the terms first, second, etc. are used to distinguish one element from another.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized to store instructions for execution of the processing described herein. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

What is claimed is:

1. A computer implemented method for identifying transmission errors, the method comprising:
    receiving an atomic data unit, the receiving via a multi-link transmission medium, the multi-link transmission medium comprising a plurality of transmission links;
    monitoring continuously all transmission links in the multi-link transmission medium using an error detection code;
    detecting an error condition in response to the receiving and the monitoring, the detecting using the error detection code to determine an error condition location and the error condition;
    determining whether the error condition is isolated to a single transmission link;
    determining if the single transmission link has been isolated previously by the error detection code as a failing transmission link a specified number of times within an interval specified by a timer based on comparing a same lane error counter to a same lane error threshold before a pre-specified time period of the timer has elapsed;
    in response to determining that the single transmission link has been isolated previously as a failing transmission link a specified number of times within an interval specified by a timer:
        identifying the single transmission link as a faulty transmission link;
        resetting the timer; and
        outputting an identifier of the single transmission link;
    determining that a general error has occurred based on determining that the error condition cannot be isolated to one transmission link or that the error condition is isolated to a single transmission link that has not been isolated previously as a failing transmission link within a specified number of preceding error events;
    incrementing a general error counter and resetting the same lane error counter based on determining that the general error has occurred;
    determining if more than a specified number of general errors have occurred; and
    outputting a general error indicator in response to determining that more than a specified number of general errors have occurred.

2. The method of claim 1, wherein the single transmission link is identified as a faulty transmission link further in response to determining that the single transmission link has been isolated previously as a failing transmission link a specified number of consecutive times.

3. The method of claim 1, wherein the outputting a general error indicator is further in response to determining that more than a specified number of general errors have occurred within a specified time period.

4. The method of claim 1, wherein the outputting a general error indicator is further in response to determining that more than a specified number of consecutive general errors have occurred.

5. The method of claim 1, wherein the atomic data unit is a memory data frame, and the multi-link transmission medium is a memory bus connecting at least two processors, memory buffers, memory devices, and memory controllers.

6. The method of claim 1, comprising monitoring all of the plurality of transmission links for an error condition using the error detection code.

7. A system for identifying transmission errors, the system comprising:
    a receiver for receiving an atomic data unit via a multi-link transmission medium, the multi-link transmission medium comprising a plurality of transmission links; and
    an error isolation unit in communication with the receiver, the error isolation unit configured to perform a method comprising:
    monitoring continuously all transmission links in the multi-link transmission medium using an error detection code;
    detecting an error condition in response to the receiving and the monitoring, the detecting using the error detection code to determine an error condition location and the error condition;
    determining whether the error condition is isolated to a single transmission link;
    determining if the single transmission link has been isolated previously by the error detection code as a failing transmission link a specified number of times within an interval specified by a timer based on comparing a same lane error counter to a same lane error threshold before a pre-specified time period of the timer has elapsed;
    in response to determining that the single transmission link has been isolated previously as a failing transmission link a specified number of times within an interval specified by a timer:
        identifying the single transmission link as a faulty transmission link;
        resetting the timer; and
        outputting an identifier of the single transmission link;
    determining that a general error has occurred based on determining that the error condition cannot be isolated to one transmission link or that the error condition is isolated to a single transmission link that has not been isolated previously as a failing transmission link within a specified number of preceding error events;
    incrementing a general error counter and resetting the same lane error counter based on determining that the general error has occurred;
    determining if more than a specified number of general errors have occurred; and outputting a general error indicator in response to determining that more than a specified number of general errors have occurred.

8. The system of claim 7, wherein the single transmission link is identified as a faulty transmission link further in response to determining that the single transmission link has been isolated previously as a failing transmission link a specified number of consecutive times.

9. The system of claim 7, wherein the outputting a general error indicator is further in response to determining that more than a specified number of general errors have occurred within a specified time period.

10. The system of claim 7, wherein the outputting a general error indicator is further in response to determining that more than a specified number of consecutive general errors have occurred.

11. The system of claim 7, wherein the atomic data unit is a memory data frame, the multi-link transmission medium is a memory bus connecting at least two processors, memory buffers, memory devices, and memory controllers.

12. The system of claim 7, wherein a spare link used to repair failed transmission links is not used to detect the error condition.

13. A computer program product for identifying transmission errors, the computer program product comprising a non-transitory computer readable storage medium and storing instructions for execution by the processing circuit for performing a method comprising:
 receiving an atomic data unit, the receiving via a multi-link transmission medium, the multi-link transmission medium comprising a plurality of transmission links;
 monitoring continuously all transmission links in the multi-link transmission medium using an error detection code;
 detecting an error condition in response to the receiving and the monitoring, the detecting using the error detection code to determine an error condition location and the error condition;
 determining whether the error condition is isolated to a single transmission link;
 determining if the single transmission link has been isolated previously by the error detection code as a failing transmission link a specified number of consecutive times within an interval specified by a timer based on comparing a same lane error counter to a same lane error threshold before a pre-specified time period of the timer has elapsed;
 in response to determining that the single transmission link has been isolated previously as a failing transmission link a specified number of consecutive times within an interval specified by a timer:
  identifying the single transmission link as a faulty transmission link;
  resetting the timer; and
  outputting an identifier of the single transmission link;
 determining that a general error has occurred based on determining that the error condition cannot be isolated to one transmission link or that the error condition is isolated to a single transmission link that has not been isolated previously as a failing transmission link within a specified number of preceding error events;
 incrementing a general error counter and resetting the same lane error counter based on determining that the general error has occurred;
 determining if more than a specified number of general errors have occurred; and
 outputting a general error indicator in response to determining that more than a specified number of general errors have occurred.

14. The computer program product of claim 13, wherein the single transmission link is identified as a faulty transmission link further in response to determining that the single transmission link has been isolated previously as a failing transmission link a specified number of times.

15. The computer program product of claim 13, wherein the outputting a general error indicator is further in response to determining that more than a specified number of general errors have occurred within a specified time period.

16. The computer program product of claim 13, wherein the outputting a general error indicator is further in response to determining that more than a specified number of consecutive general errors have occurred.

17. The computer program product of claim 13, wherein the atomic data unit is a memory data frame, the multi-link transmission medium is a memory bus connecting at least two processors, memory buffers, memory devices, and memory controllers.

18. The computer program product of claim 13, wherein a spare link used to repair failed transmission links is not used to detect the error condition.

19. A system for identifying transmission errors, the system comprising:
 a syndrome analysis means for receiving syndromes associated with an atomic data unit, for detecting an error condition, for analyzing the error condition to determine if the error condition can be isolated to a single transmission link that has been previously isolated within a specified number of preceding error events, and for outputting a signal indicating one of a single transmission link that has previously been isolated within a specified number of preceding error events, a single transmission link that has not been previously isolated within a specified number of preceding error events, and an error that cannot be isolated to one transmission link, the syndrome analysis means continuously monitoring all transmission links in a multi-link transmission medium; and
 a circuit comprising:
 a same lane error counter in communication with the syndrome analysis means for receiving the signal and for incrementing in response to the signal indicating a single transmission link that has been previously isolated;
 a same lane error threshold comparator in communication with the same lane error counter for outputting an identifier of the single transmission link in response to determining that the same lane error counter has exceeded a same lane error threshold;
 a general error counter in communication with the syndrome analysis means for receiving the signal and for incrementing in response to the signal indicating an error that cannot be isolated to one transmission link, or can be isolated to a single transmission link that has not been isolated previously as a failing transmission link within a specified number of preceding error events, and further resetting the same lane error counter when incrementing the error counter; and
 a general lane error threshold comparator in communication with the general error counter for outputting a general error flag in response to determining that the general error counter has exceeded a general error flag threshold.

20. The system of claim 19, further comprising a same lane error timer for resetting the same lane error counter to zero in response to a specified time period elapsing.

21. The system of claim 20, further comprising a general error timer for resetting the general error counter to zero in response to a specified time period elapsing.

* * * * *